United States Patent
Keller (10) Patent No.: US 6,748,442 B1
(45) Date of Patent: Jun. 8, 2004

(54) METHOD AND APPARATUS FOR USING A CONTROL SIGNAL ON A PACKET BASED COMMUNICATION LINK

(75) Inventor: James B. Keller, Palo Alto, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/477,125

(22) Filed: Jan. 3, 2000

Related U.S. Application Data (63) Continuation-in-part of application No. 09/217,699, filed on Dec. 21, 1998, now Pat. No. 6,370,621.

(51) Int. Cl.⁷ .................. G06F 15/16; G06F 15/167; G06F 3/00; G06F 13/42; G06F 15/00; G06F 9/30; G06F 11/00; H04L 12/40; H04J 3/00; H04J 3/22; H04J 3/24

(52) U.S. Cl. ............... 709/232; 709/211; 709/212; 709/216; 709/236; 709/237; 370/230; 370/439; 370/473; 370/474; 370/476; 370/520; 710/29; 710/61; 710/105; 712/214; 712/220; 712/233

(58) Field of Search .................. 709/208, 209, 709/211, 212, 213, 214, 216, 225, 231, 232, 233, 236, 215, 237; 370/230, 438, 439, 445, 463, 464, 473, 474, 476, 469

(56) References Cited

U.S. PATENT DOCUMENTS

| | | | | |
|---|---|---|---|---|
| 4,480,307 A | * | 10/1984 | Budde et al. | 710/100 |
| 5,072,443 A | * | 12/1991 | Hahne et al. | 370/440 |
| 5,315,587 A | * | 5/1994 | Kullander | 370/235 |
| 5,315,708 A | * | 5/1994 | Eidler et al. | 711/119 |
| 5,440,698 A | * | 8/1995 | Sindhu et al. | 709/225 |
| 5,469,435 A | * | 11/1995 | Krein et al. | 370/462 |
| 5,511,165 A | * | 4/1996 | Brady et al. | 709/216 |
| 5,581,745 A | | 12/1996 | Muraoka et al. | 395/557 |
| 5,613,163 A | | 3/1997 | Marron et al. | 395/879 |
| 5,719,858 A | * | 2/1998 | Moore | 370/347 |
| 5,732,286 A | * | 3/1998 | Leger | 710/57 |
| 5,748,914 A | * | 5/1998 | Barth et al. | 710/105 |
| 5,822,538 A | * | 10/1998 | Krishna et al. | 709/235 |
| 5,835,492 A | * | 11/1998 | Aimoto et al. | 370/389 |
| 5,838,684 A | * | 11/1998 | Wicki et al. | 370/416 |

(List continued on next page.)

OTHER PUBLICATIONS

Kunin, Stephen G. Claiming the Benefit of a Prior–Filed Application under 35 USC 119(e), 120, 121, and 365(c). http://www.uspto.gov/web/offices/pac/dapp/opla/preognotice/benefitclaims.pdf.*

Yau, V. et al. "Improved Nested– Threshold–Cell–Discard Buffer Management Mechanisms", IEEE Region 10 TENCON '92. Technology Enabling Tomorrow. Nov. 11–13, 1992. vol. 2, Pp. 820–824.*

Mazidi, Muhammad and Mazidi, Janice. "The 80×86 IBM PC & Compatible Computers, vols. I and II, Second Edition." Prentice Hall, 1998, P. 802.*

Primary Examiner—Rupal Dharia
Assistant Examiner—Melvin H. Pollack
(74) Attorney, Agent, or Firm—Zagorin, O'Brien & Graham, LLP (57) ABSTRACT

A computer system has a communication link that includes a control signal and data lines. A first control packet having a plurality of bytes is transferred over the data lines from a first to a second node on the communication link. The control line is asserted to indicate transfer of a control packet. After transfer of the first control packet, a first portion of a multi-byte data packet associated with the first control packet is transferred with the control line deasserted. During transfer of the data packet the control line is asserted and transfer of the data packet is suspended. A second control packet is then transferred over the data lines. Subsequent to transferring the second control packet, the remainder of the data packet is transferred with the control line deasserted.

22 Claims, 5 Drawing Sheets

U.S. PATENT DOCUMENTS

| | | | | |
|---|---|---|---|---|
| 5,852,718 | A * | 12/1998 | Van Loo | 709/208 |
| 5,872,944 | A | 2/1999 | Goldrian et al. | 395/306 |
| 5,898,881 | A * | 4/1999 | Miura et al. | 712/16 |
| 5,907,485 | A * | 5/1999 | Van Loo et al. | 700/3 |
| 5,986,980 | A * | 11/1999 | Takeshita et al. | 369/30.23 |
| 6,028,841 | A * | 2/2000 | Lyon et al. | 370/232 |
| 6,032,211 | A | 2/2000 | Hewitt | 710/107 |
| 6,047,322 | A * | 4/2000 | Vaid et al. | 709/224 |
| 6,052,384 | A * | 4/2000 | Huang et al. | 370/468 |
| 6,055,615 | A * | 4/2000 | Okajima | 711/169 |
| 6,058,440 | A * | 5/2000 | Bloch et al. | 710/60 |
| 6,097,700 | A * | 8/2000 | Thornberg et al. | 370/233 |
| 6,104,749 | A * | 8/2000 | Lu et al. | 375/222 |
| 6,105,079 | A * | 8/2000 | Kuo et al. | 710/25 |
| 6,105,107 | A * | 8/2000 | Ho et al. | 711/112 |
| 6,161,160 | A * | 12/2000 | Niu et al. | 710/310 |
| 6,167,029 | A * | 12/2000 | Ramakrishnan | 370/235 |
| 6,170,025 | B1 * | 1/2001 | Drottar et al. | 710/48 |
| 6,182,112 | B1 * | 1/2001 | Malek et al. | 709/201 |
| 6,185,633 | B1 * | 2/2001 | Johnson | 710/22 |
| 6,185,693 | B1 * | 2/2001 | Garmire et al. | 713/503 |
| 6,192,422 | B1 * | 2/2001 | Daines et al. | 710/29 |
| 6,205,119 | B1 * | 3/2001 | Kaczynski | 370/231 |
| 6,247,061 | B1 * | 6/2001 | Douceur et al. | 709/240 |
| 6,266,727 | B1 * | 7/2001 | Smyers et al. | 710/105 |
| 6,289,402 | B1 * | 9/2001 | Davis | 710/31 |
| 6,311,294 | B1 * | 10/2001 | Larky et al. | 714/44 |
| 6,345,330 | B2 * | 2/2002 | Chu | 710/65 |
| 6,347,351 | B1 * | 2/2002 | Osborne et al. | 710/119 |
| 6,366,583 | B2 * | 4/2002 | Rowett et al. | 370/401 |
| 6,370,621 | B1 * | 4/2002 | Keller | 711/141 |
| 6,385,672 | B1 * | 5/2002 | Wang et al. | 710/56 |
| 6,389,501 | B1 * | 5/2002 | Garney et al. | 710/310 |
| 6,421,352 | B1 * | 7/2002 | Manaka et al. | 370/445 |
| 6,473,818 | B1 * | 10/2002 | Niu et al. | 711/168 |
| 6,490,661 | B1 * | 12/2002 | Keller et al. | 711/150 |
| 6,496,895 | B1 * | 12/2002 | Harriman et al. | 710/306 |
| 6,496,940 | B1 * | 12/2002 | Horst et al. | 714/4 |
| 6,499,079 | B1 * | 12/2002 | Gulick | 710/305 |

* cited by examiner

| Bit Time | 7 | 6 | 5 | 4 | 3 | 2 | 1 | 0 |
|---|---|---|---|---|---|---|---|---|
| 1 | Command-Specific | | Cmd[5:0] | | | | | |
| 2 | Command-Specific | | | | | | | |
| 3 | Command-Specific | | | | | | | |
| 4 | Command-Specific | | | | | | | |

FIG. 4A

| Bit Time | 7 | 6 | 5 | 4 | 3 | 2 | 1 | 0 |
|---|---|---|---|---|---|---|---|---|
| 1 | SeqID[3:2] | | Cmd[5:0] | | | | | |
| 2 | PassPW | SeqID[1:0] | | UnitID[4:0] | | | | |
| 3 | Command-Specific | | | | | | | |
| 4 | Command-Specific | | | | | | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

FIG. 4B

| Bit Time | 7 | 6 | 5 | 4 | 3 | 2 | 1 | 0 |
|---|---|---|---|---|---|---|---|---|
| 1 | Command-Specific | | Cmd[5:0] | | | | | |
| 2 | PassPW | Bridge | Rsv | UnitID[4:0] | | | | |
| 3 | Error | Rsv | | SrcTag[4:0] | | | | |
| 4 | Rsv | | | | | | Command-Specific | |

FIG. 4C

| BIT TIME | 7 | 6 | 5 | 4 | 3 | 2 | 1 | 0 |
|---|---|---|---|---|---|---|---|---|
| 1 | DATA[7:0] | | | | | | | |
| 2 | DATA[15:8] | | | | | | | |
| 3 | DATA[23:16] | | | | | | | |
| 4 | DATA[31:24] | | | | | | | |
| 5 | DATA[39:32] | | | | | | | |
| 6 | DATA[47:40] | | | | | | | |
| 7 | DATA[55:48] | | | | | | | |
| 8 | DATA[63:56] | | | | | | | |

FIG. 5

METHOD AND APPARATUS FOR USING A CONTROL SIGNAL ON A PACKET BASED COMMUNICATION LINK

This application is a continuation-in-part of application Ser. No. 09/217,699, filed Dec. 21, 1998, now U.S. Pat. No. 6,370,621.

BACKGROUND OF THE INVENTION

1. Field of the Invention

This application relates to packet based communication links and more particularly to use of a control signal to send control related information over the link.

2. Description of the Related Art

Figure 1:
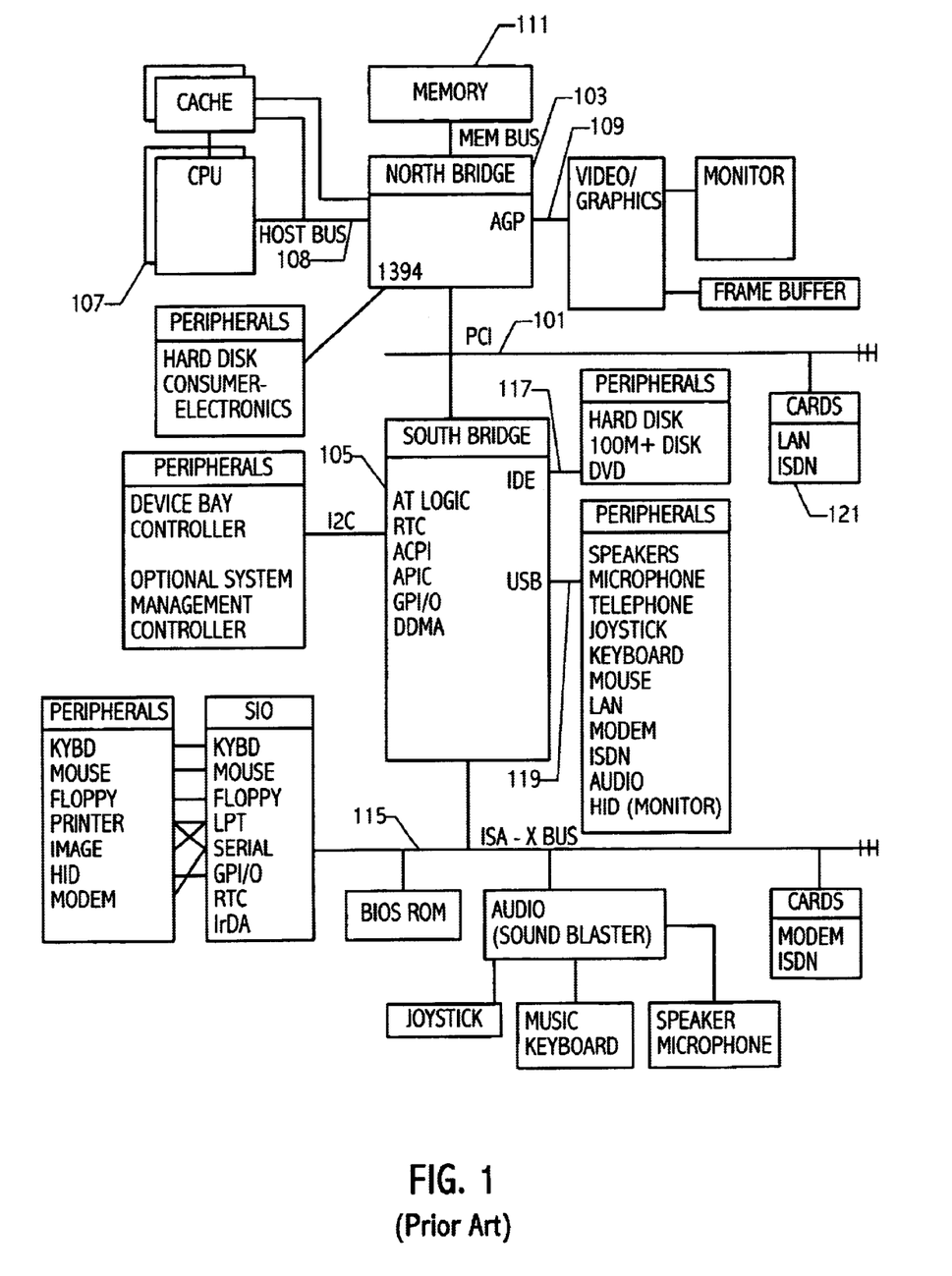
FIG. 1 shows a prior art computer system.

Traditional personal computer architectures partition the computer system into the various blocks shown in the exemplary prior art system illustrated in FIG. 1. One feature of this prior art architecture is the use of the Peripheral Component Interconnect (PCI) bus 101 as the connection between the "north bridge" integrated circuit 103 and the "south bridge" integrated circuit 105. The north bridge functions generally as a switch connecting CPU 107, a graphics bus 109 such as the Advanced Graphics Port (AGP) bus, the PCI bus and main memory 111. The north bridge also contains the memory controller function. The architecture also includes the "host bus" connection 108 between north bridge 103 and processor 107.

The south bridge 105 provides an interface to various input/output (I/O) portions of the computer system by providing a bridge function between the PCI and legacy ISA bus 115, the Integrated Device Electronics (IDE) disk interface 117 and the Universal Serial Bus (USB) 119. Other devices, buses and functions may also be included in the South Bridge 105. In the illustrated prior art architecture, PCI bus 101 also functions as a major input/output bus for add-in functions such as network connection 121. The various busses and devices shown in FIG. 1 are conventional in the personal computer industry and are not described further herein.

Demand for increased system performance and the continuing increase in processor speeds puts pressure on system buses such as the PCI bus and the host bus to also provide better performance. However, configuration of some of the present buses, such as the multi-drop configuration of the PCI bus, tends to limit its performance.

One type of information that needs to be transferred between the various components in the computer system is a variety of control information. Such control information may relate to a particular transfer on the interconnection such as the type of transfer taking place, may indicate a target address for an operation or may relate to such system information as configuration, interrupts or power management. As levels of integration increase and more functions are integrated into fewer components, more functions must send information over the same interconnect. As a result, there is a danger that latency of certain control information can become unacceptably long. Further, given the continually increasing speeds of processors and other system components, latencies that were previously acceptable may have become unacceptable.

Thus, it would be desirable to have a high speed interconnect providing improved quality of service for the various components of the computer system. It would also be desirable that such an interconnect address potential latency issues that may be related to transmission of control information.

SUMMARY OF THE INVENTION

Accordingly, the invention allows a control packet with potentially higher priority control information to be inserted into the middle of a data packet. After completing transfer of the inserted control packet, transfer of the interrupted data packet then resumes at the point that it left off.

In one embodiment the invention provides a method of operating a computer system. The method includes transferring at least a first byte of a data packet having multiple bytes, from a first node to a second node of a communication link. The communication link includes a control signal, which is asserted during transfer of the data packet, before all of the bytes of the data packet have been transferred. Transfer of the data packet is then suspended in synchronism with asserting the control signal. After the suspension, a control packet, which includes a command field, is transferred with the control signal asserted. After transferring the control packet, the control signal is again deasserted and transfer of the data packet resumes at the point where it was suspended.

In another embodiment the invention provides an integrated circuit that includes a plurality of terminals for coupling to a communication link. The integrated circuit includes terminals for a first data portion of the communication link and for a first control line of the communication link. The integrated circuit also includes control logic coupled to supply the first data portion with a first control packet and to supply the first data portion with a data packet of multiple bytes associated with the first control packet. The control logic is responsive to availability of a second control packet to suspend transfer of the first data packet, insert the second control packet on the first data portion and then resume transfer of the data packet on completion of transferring the second control packet. The control line indicates whether the packet being transferred is a control packet or a data packet.

In another embodiment, a computer system is provided that includes a first node, a second node and a communication link connecting the first and second nodes. The communication link includes a first data portion and a first control line. The first data portion carries data packets of multiple bytes and control packets from the first to the second node. The first control line is at a first value during transfer of the control packets and at a second value during transfer of the data packets. Control logic in the first node is responsive to suspend transfer of one of the data packets and to place the control line at the first value to indicate the suspension. The control logic then inserts a control packet onto the first data portion and resumes the data packet transfer on completion of the transfer of the inserted control packet.

BRIEF DESCRIPTION OF THE DRAWINGS

The present invention may be better understood, and its numerous objects, features, and advantages made apparent to those skilled in the art by referencing the accompanying drawings.

DESCRIPTION OF THE PREFERRED EMBODIMENT(S)

Figure 2:
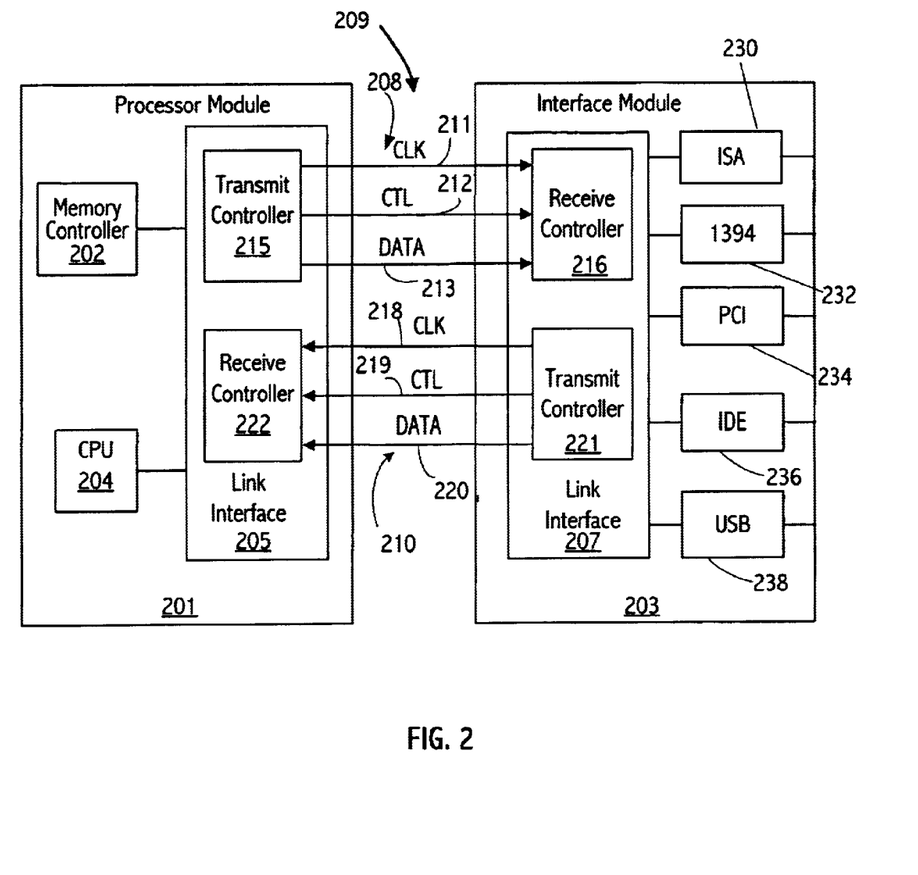
FIG. 2 shows two nodes connected by a link which can utilize the invention described herein.

Referring to FIG. 2, a portion of an exemplary personal computer system is shown which utilizes a high speed interconnect according to one embodiment of the present invention. The computer system includes node 201 and node 203. Node 201 includes a link interface 205 which is coupled to link interface 207 in node 203 via a high speed packet based interconnect (also referred to herein as link) 209. Link 209 connects node 201 and node 203 via two unidirectional sets of wires 208 and 210. A node is a physical entity that connects to one end of a link. One set of wires 210 on link 209 includes unidirectional clock line 211, control line 212 and data lines 213 connecting transmit controller 215 in node 201 to receive controller 216 in node 203. The second set of wires on link 209 includes unidirectional clock line 218, control line 219 and data lines 220 connecting transmit controller 221 in node 203 to receive controller 222 in node 201. The data lines 213 and 220 transmit command, address and data information between nodes 201 and 203. The transmit and receive controllers provide the control logic for link operations.

Each of the data lines 213 and 220 may include $2^n$ data bits where $n \geq 0$. Thus, a minimum implementation has one data bit in each direction. However, each unidirectional connection is typically in byte multiples of 8, 16, 32 bits or larger and is fixed in size. Note however, that the link does not have to be symmetrical. In other words, data lines 213 may be one byte wide, while data lines 220 are four bytes wide. Each unidirectional connection 208 and 210 includes one control line, regardless of the number of data lines on that unidirectional portion.

In an exemplary embodiment, node 201 is a processor module that provides the major processing function in a computer system and includes a memory controller 202 and one or more central processing units (CPUs) 204. Processor module 201 may include one or more integrated circuits. In addition, processor module 201 may include system memory (not shown) coupled to the memory controller. Node 203 in the exemplary embodiment shown in FIG. 2 is an interface module that provides an interface between various input/output devices such as hard drives, scanners, printers, network connections, modems etc., and the processor module. The exemplary I/O module 203 includes ISA interface 230 (providing an interface to the industry standard architecture (ISA) bus), IEEE 1394 interface 232, Peripheral Component Interconnect bridge (PCI) 234, Intelligent Drive Electronics (IDE) controller 236 and USB interface 238. Interface module 203 may be a single integrated circuit. Other types of buses and input/output devices connecting may also be present on interface module 203 in place of or in addition to those described.

In the illustrated embodiment, interconnect 209 is a point to point link physically connecting precisely two integrated circuits. In that way, transfer speed across the link may be maximized.

A bit time is half a clock (CLK) period in duration. That is, two data bits are transmitted on each wire per cycle on the link. For example, for a clock (CLK) rate of 400 megahertz, data is provided on each edge of the clock which results in 800 million bit times per second.

Link 209 transfers packet based information to and from a unit or function, which is a logical entity within a node, such as memory controller 202 that acts as a source or a destination for transactions. A transaction is a sequence of packets exchanged between two or more nodes in the system which results in a transfer of information. A source is the node that starts a transaction. A target is the node that ultimately services the transaction on behalf of the source. There may be intermediary nodes between the source and the destination. That is, the link may be configured as a daisy chain.

In addition to the data, CTL and CLK signals, each device in the link receives a PwrOk signal (not shown) indicating that power is stable and clocks have been running for a predetermined amount of time. Each device on the link also receives a reset signal (not shown).

The packet structure described herein is described with relation to 8 bit wide data lines. The packet structure for wider links, e.g., 16 and 32 bit links, can be derived from the 8-bit link packet structure by combining the fields within adjacent bit times. For example, $$BT1_{16}[15:0] = BT2_8[7:0] \& BT1_8[7:0]$$

$$BT1_{32}[31:0] = BT4_8[7:0] \& BT3_8[7:0] \& BT2_8[7:0] \& BT1_8[7:0]$$

where $BTN_m$ represents the Nth bit time within a packet for a link of width m and "&" represents concatenation. Thus, its takes two bit times to transfer the same information on an eight bit link as can be transferred on a sixteen bit link. Note that if all packets are multiples of 4 bytes long, packet boundaries will always fall on bit-time boundaries in the 16 and 32 bit case, as well as the 8 bit case and thus CTL may only be asserted on 4 byte boundaries in certain implementations.

The link transmits control packets and data packets. The control signals 212 or 219 distinguish between the two types of packets. Control packets provide control information. For example, the control information may indicate the kind of command (read or write) or an address to which the command is directed. Data packets carry data related to corresponding read or write operations.

In order to reduce latency for information in control packets and to provide flexibility, the CTL signal allows control packets to be inserted in the middle of data packets. That is particularly advantageous when data packets are long. However, due to latency considerations in certain applications, it may be undesirable to put a write packet in a read response. In addition, in other embodiments, the control signal can also be used to insert delays in the middle of control packets.

The link in the embodiment described herein is assumed to be a pipelined split transaction link in which transactions are tagged by the source and responses can return out of order. Write command and read response packets always have an associated data packet. The data packet associated with the write command is the write data. The data packet associated with the read response is the requested read data for a previously sent read command.

Figure 3A:
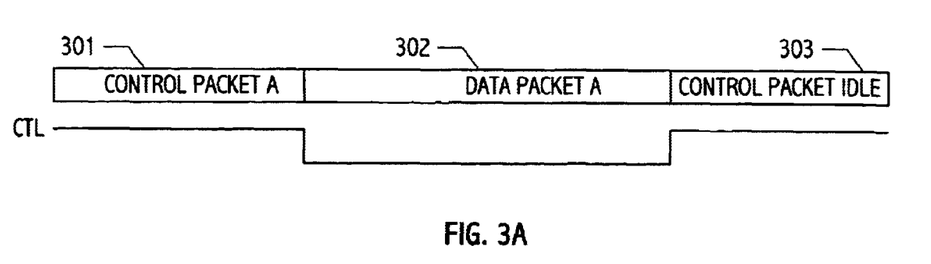
FIGS. 3A–3D show various uses of the control line according to various embodiments of the invention described herein.

Referring to FIGS. 3A–3D, the use of the control signal is illustrated. As shown in FIG. 3A, the link transmit controller asserts the control signal (CTL) during all bit times of control packet 301. The link transmit controller deasserts the CTL signal during bit times of data packets and thus the CTL signal is shown deasserted during data packet 302. The use of the term assert and deassert associated with FIGS. 3A–3D is used for convenience and is not intended to imply that any particular voltage value for the control signal is necessary to practice the invention. Note that data packet 302 is the data packet associated with the control information in control packet 301. The association is indicated by the "A" in associated control and data packets. After completion of data packet 302, the control signal is again asserted indicating another control packet. As illustrated in FIG. 3A that control packet may be an idle packet in which flow control information is being provided from one node to another. In the embodiment shown, the bit time immediately following the last bit-time of a data packet is always the start of a control packet and thus CTL is asserted.

Figure 3B:
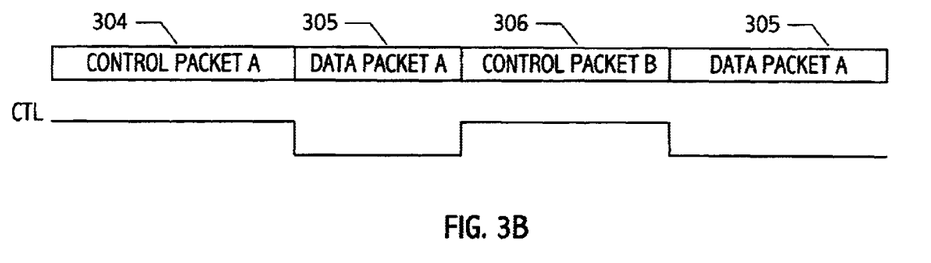

Referring to FIG. 3B, CTL may also be used insert control packets in the middle of data packets. Thus, control packet 304 is transmitted with control asserted. The associated data packet 305 transmission begins, with control deasserted. In the middle of data packet 305, the transmission of data packet 305 is halted, the control line is again asserted to insert another control packet 306, which is unrelated to data packet 305. After completion of control packet 306, data packet 305 resumes and completes. Thus, the control signal may be used to insert control packets into data packets. That allows long data packets to be sent without worrying about latency of control information. Note that in the illustrated embodiments, control is only asserted during a data packet to send another control packet.

Figure 3C:
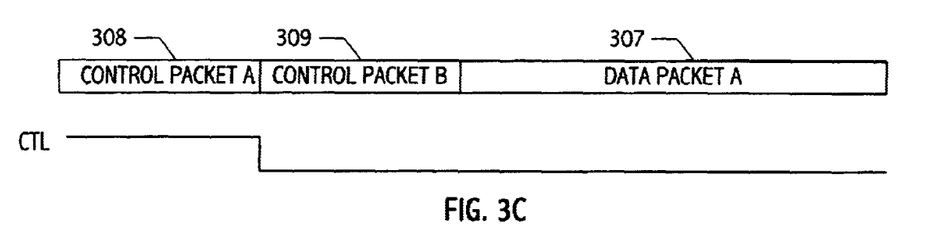

FIG. 3C, illustrates that a data packet, e.g., data packet 307, may not always immediately follow the last bit time of its associated control packet 308. Another control packet 309 can be placed between a control packet and its associated data packet, or as previously illustrated, even in the middle of a data packet. However, those other control packets should not have associated data packets.

Figure 3D:
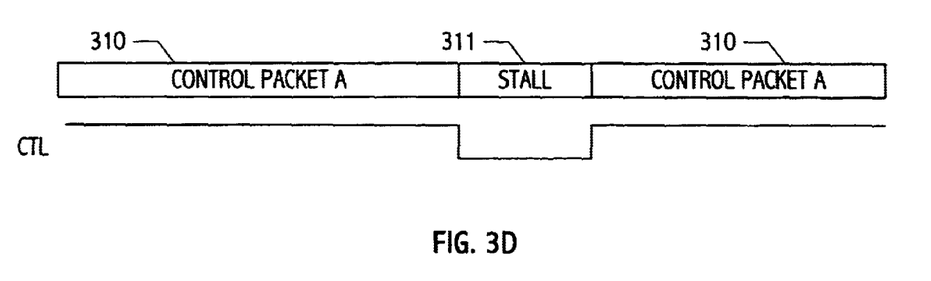

Referring to FIG. 3D, CTL may also be used to insert stalls in control packets. Stalls may be used when, e.g., data is not ready on a block read from a slow device or when devices are running at different clock speeds. Thus, for example control packet 310 may be stopped as indicated by the deassertion of the CTL signal at the beginning of stall 311. In an embodiment where the control signal changes on 4 byte boundaries (4 bit times for an 8 bit link), for a stall to be utilized in a control packet, the control packet should be at least 8 bit times. Other embodiment may utilize different boundaries on which to change the control signal. Such boundaries will depend on such factors as the width of the link and the size of the packets. No valid information is transmitted on the data portion of the link (being used for the control packet) during the stall.

In the illustrated embodiment, CTL may only be deasserted when data transfer due to a previously transmitted control packet is pending, or in the middle of a control packet.

A packet structure for one embodiment of the invention will now be described in more detail in order to provide examples on the use of the control signal, the types of data packets that may be interrupted and the types of control packets that may be stalled, inserted in another data packet or inserted after a control packet and before the associated control packet.

Figure 4A:
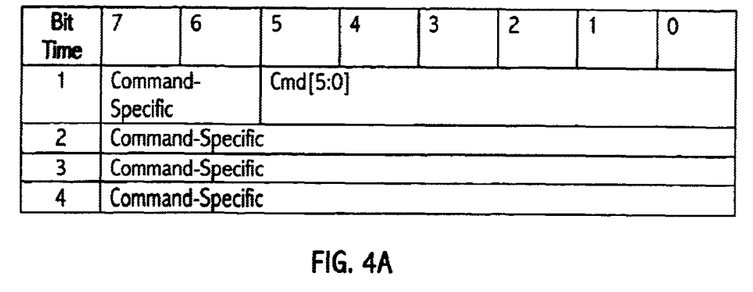
FIGS. 4A–4C show illustrative control packets.
Figure 4B:
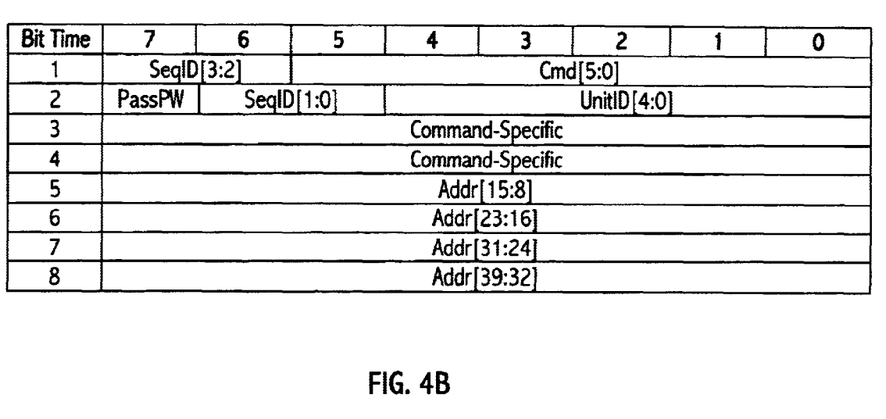
Figure 4C:
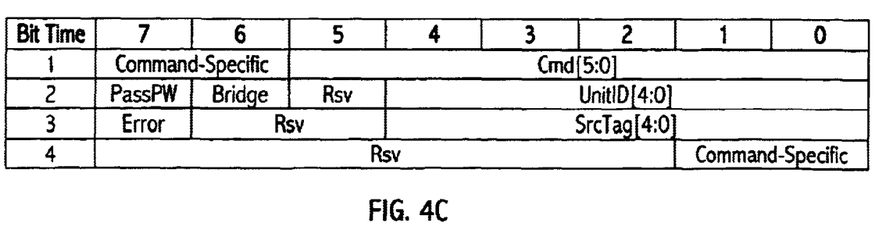

Referring to FIGS. 4A–4C, illustrative control packets are shown. All packets shown are multiples of 4 bytes long. The control packets illustrated are either four or eight bytes long. The details of the specific fields in the control packet depend upon the detailed implementation of the system which will vary from embodiment to embodiment. In the FIGS. 4A–4C, those fields that are command specific are indicated as such.

FIG. 4A illustrates a special control packet which is an "Info" packets. The Info packets are 4 bytes long and are used for nearest neighbor communication between nodes, and exist at a lower level of the protocol than anything else.

They are not routed within a fabric of multiple nodes, and require no buffering in the nodes. They are not flow-controlled, and can always be accepted by their destination. (Flow control provides information relating to whether the target has sufficient resources available to accommodate a particular command.)

FIG. 4B illustrates the common fields in a command packet. Command packets are either 4 or 8 bytes long, depending upon whether the command has an associated address. FIG. 4B shows an 8 byte command packet with a 4 byte address (bit times 5–8). 4-byte command packets do not contain the address field as illustrated in FIG. 4C. The common fields in the illustrated command packets include the command field (Cmd[5:0]) which defines the packet type. The Unit ID (UnitID[4:0]) identifies participants in a e transaction on the link. In one embodiment, in which all packets are transferred either to or from a host bridge, i.e. the bridge coupling a CPU to the link, either the source or destination node is implied. The value zero is reserved for the Unit ID of the host bridge. The value 31 is reserved and may not be used by any device. For requests, Unit ID denotes the source of the request. For responses travelling downstream (away from the host bridge), Unit ID denotes the node to which the response is being sent. For responses travelling upstream (towards the host bridge), Unit ID denotes the node that generated the response.

Nodes with multiple logical I/O streams may own multiple Unit ID values. For example, interface module 203 may be a node with multiple IDs associated with the various interfaces 230–238. Sequence ID (SeqId[3:0]) is used to tag groups of requests which were issued as part of an ordered sequence by a device, and must be strongly ordered within a virtual channel. Virtual channels can be used to group particular kinds of traffic on the link. All requests within the same I/O stream and virtual channel that have matching nonzero sequence ID fields must have their ordering maintained. The sequence ID value of 00 is reserved to mean that a transaction is not part of a sequence. Transactions with this value have no sequence ordering restrictions, although they may be ordered for other reasons. PassPW indicates that this packet is allowed to pass packets in the posted request channel in the same I/O stream. Otherwise, it must stay in order behind them. Bytes three and four of the four byte command packet are command specific. The last four bytes (Addr[39:8]) represent the doubleword address accessed by the command. Not all address bits are included in all command types. Where finer granularity is required, byte enables may be used.

An illustrative control packet for a response is illustrated in FIG. 4C and is four bytes long. The bridge field indicates whether the response packet was placed onto the link by the host bridge, and is used to distinguish responses travelling upstream from responses travelling downstream. The source tag field SrcTag[4:0] is a transaction tag which is used to uniquely identify all transactions in progress from a single requester. Each node can have up to 32 transactions in progress at one time.

The command field will of course vary from system to system. Exemplary commands include NOPs (no operation), write commands, read commands, and read responses. In addition, commands may relate to initialization of the links, or maintaining coherency where the link is used in a fabric of nodes requiring coherency be maintained, e.g., in a multi-processor environment.

Figure 5:
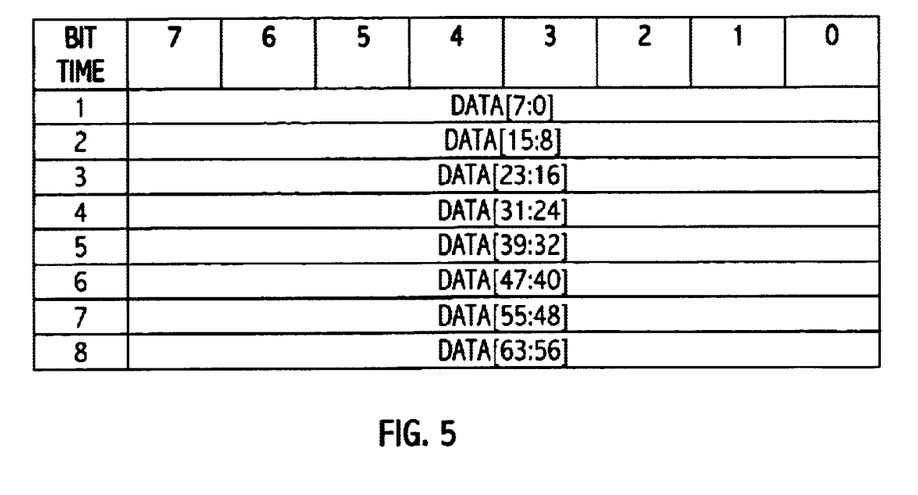
FIG. 5 shows an illustrative data packet.

FIG. 5 illustrates an exemplary data packet, which contains the data payload for a transaction. As previously described, data packets follow write command and read response packets. In one particular embodiment, data packets range in length from 4 to 64 bytes, in multiples of 4 bytes (1 doubleword). FIG. 5 illustrates an eight byte packet. Within a doubleword, data bytes appear in their natural byte lanes. For transfers of less than a full doubleword, the data may be padded with undefined bytes to achieve this byte lane alignment. Where the control line is asserted on 4 byte boundaries, if the control line is asserted during the data packet illustrated in FIG. 5 to stop the transfer and insert a control packet, the data packet is stopped after bit time 4.

The description of the invention set forth herein is illustrative, and is not intended to limit the scope of the invention as set forth in the following claims. For example, while specific control and data packets have been described, the size and configuration of the data and control packets may vary. The specific content of the control and data packets is not critical to understanding the invention described herein and typically varies from system to system. As long as the data packet includes multiple bit times, then the data packet may be stopped and a control packet inserted using the teachings of the invention described herein. Further, as described herein, the control line may also be used to stall a control packet, if the control packet includes multiple bit times. Other variations and modifications of the embodiments disclosed herein, may be made based on the description set forth herein, without departing from the scope and spirit of the invention as set forth in the following claims.

What is claimed is:

1. A method of operating a computer system, comprising:
    transferring at least a first byte of a data packet from a first node to a second node of a communication link, the communication link including a control signal, the data packet including a plurality of bytes;
    asserting the control signal and suspending transfer of the data packet in synchronism with asserting the control signal, before all of the bytes of the data packet have been transferred;
    following the suspending, transferring a control packet with the control signal asserted, the control packet including a command field; and
    deasserting the control signal in synchronism with the end of the control packet and resuming transfer of the data packet with the control signal deasserted at the byte where it was suspended.

2. The method as recited in claim 1 wherein the control packet includes a plurality of bytes.

3. The method as recited in claim 1 further comprising:
    transferring another control packet with the control line asserted;
    suspending transfer of the other control packet and deasserting the control signal in synchronism with suspending transfer, thereby inserting a delay in the control packet; and
    reasserting the control line and resuming transfer of the control packet.

4. The method as recited in claim 3 wherein the other control packet is multiple bytes and the suspending and resuming occurs on byte boundaries.

5. The method as recited claim 1 wherein each data packet has an associated control packet.

6. The method as recited in claim 5 wherein another control packet is transmitted between a data packet and the associated control packet.

7. The method as recited in claim 6 wherein the other control packet does not have an associated data packet.

8. The method as recited in claim 1 wherein the bus is a point to point communication link coupling only a first and second integrated circuit respectively containing in the first and a second nodes.

9. A method for communicating in a computer system having a communication link including a control signal and a unidirectional first data portion transferring control packets and data packets from a first to a second node of the communication link, the method comprising:
    distinguishing between control packets and data packets being transferred over the communication link using the control signal;
    transferring a first portion of one of the control packets over the first data portion with the control line at a first voltage level;
    changing the control line to a second voltage level during transfer of the control packet;
    suspending transfer of the control packet in synchronism with changing the control line to the second voltage level to thereby insert a stall in transferring the control packet; and
    subsequently changing the control line back to the first voltage level and resuming transfer of a second portion of the control packet.

10. The method as recited in claim 9 wherein the control packets are multiple bytes and wherein the control signal is only changed on byte boundaries.

11. The method as recited in claim 9 wherein no valid information is transferred over the first data portion during the stall.

12. A method for communicating in a computer system having a communication link including a control signal and a first data portion of the communication link transferring data from a first to a second node on the communication link, the method comprising:
    transferring a first control packet having a plurality of bytes of control information over the first data portion of the communication link, transfer of the control packet being indicated by the control line being at a first value;
    subsequently transferring a first portion of a data packet associated with tile first control packet, the data packet having a plurality of bytes, transfer of the first portion of the data packet being indicated by the control line being at a second value;
    changing the control line back to the first value during transfer of the data packet;
    suspending transfer of the data packet in synchronism with changing the control line back to the first value;
    transferring a second control packet over the first data portion of the communication link subsequent to the suspending of the data packet; and
    transferring a second portion of the data packet subsequent to transfer of the second control packet, transfer of the second portion of the data packet being indicated by the control line being at the second value.

13. The method as recited in claim 12 further comprising while sending the data packet over the first data portion of the communication link, simultaneously sending another data packet or another control packet over a second data portion of the communication link from the second to the first node.

14. The method as recited in claim 12 wherein the control line is at the first value during all bit times when control packets are being transferred on the first data portion of the communication link and is at the second value during all bit times when data packets are being transferred on the first data portion of the communication link.

15. The method as recited in claim 12 wherein the first data portion of the communication link includes one or more data lines transferring data in one direction.

16. The method as recited in claim 12 wherein the control information includes a command field defining a type of command and an address field.

17. An integrated circuit comprising:

a plurality of terminals for coupling to a communication link, the terminals including a first data portion and a first control line; and control logic coupled to supply the first data portion with a first control packet and to supply the first data portion with a data packet of multiple bytes associated with the first control packet, the control logic being responsive to availability of a second control packet to suspend transfer of the data packet, insert the second control packet and then resume transfer of the data packet on completion of transferring the control packet the control logic coupled to generate a value for the control line indicative of whether a packet being transferred is one of the control packets or the data packet.

18. A computer system, comprising:

a first node;

a second node;

a communication link connecting the first and second nodes, the communication link including, a first data portion and a first control line, the first data portion carrying data packets of multiple bytes and control packets from the first to the second node;

wherein the first control line is at a first value during transfer of the control packets and wherein the first control line is at a second value during transfer of the data packets;

and wherein control logic in the first node is responsive to suspend transfer of one of the data packets and to place the control line at the first value indicative of suspending transfer of the one data packet, the control logic being further responsive to insert a control packet on the first data portion and to resume the data packet transfer on completion of the transfer of the inserted control packet.

19. The computer system as recited in claim 18 wherein the communication link further comprises a second data portion and a second control line for transferring data packets and control packets from the second to the first node.

20. The computer system as recited in claim 19 wherein only one control line is provided for each of the first and second data portions.

21. The computer system as recited in claim 20 wherein the first and second data portions include a different number of signal lines.

22. The computer system as recited in claim 20 wherein the first and second nodes are on respective first and second integrated circuits and wherein at least one of the integrated circuit includes a central processing unit (CPU).

* * * * *

UNITED STATES PATENT AND TRADEMARK OFFICE
CERTIFICATE OF CORRECTION

PATENT NO. : 6,748,442 B1
DATED : June 8, 2004
INVENTOR(S) : James B. Keller

It is certified that error appears in the above-identified patent and that said Letters Patent is hereby corrected as shown below:

<u>Column 8,</u>
Line 3, "containing in the" should read -- containing the --

<u>Column 9,</u>
Line 21, "control packet the" should read -- control packet, the --

Signed and Sealed this

Twenty-eighth Day of September, 2004

JON W. DUDAS
*Director of the United States Patent and Trademark Office*